June 25, 1935.  M. ZAIGER  2,006,005

WINDSHIELD HEATER

Filed Dec. 18, 1934  3 Sheets-Sheet 1

Inventor.
Max Zaiger
by Heard Smith & Tennant.
Attys.

June 25, 1935. M. ZAIGER 2,006,005
WINDSHIELD HEATER
Filed Dec. 18, 1934 3 Sheets-Sheet 2
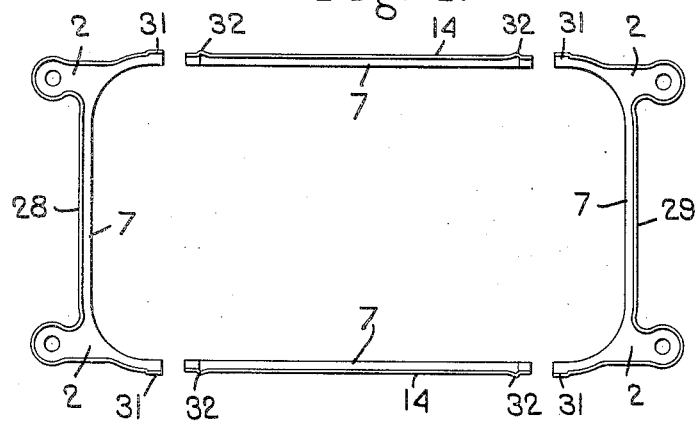
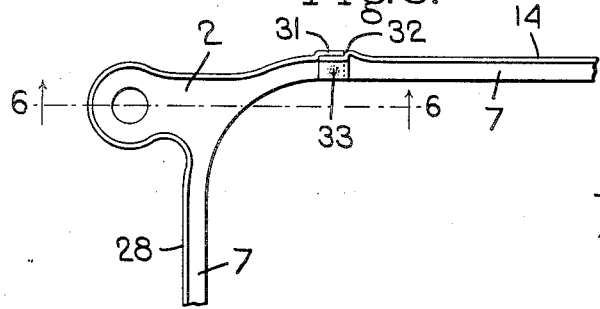
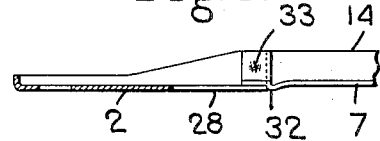
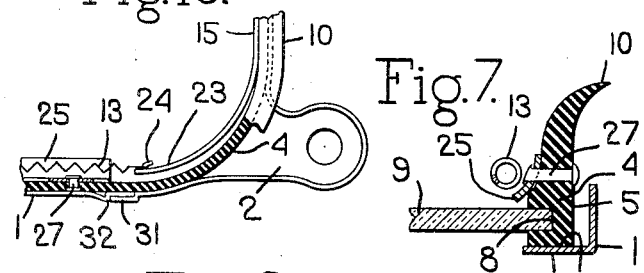
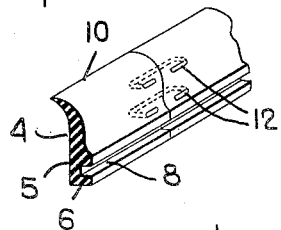
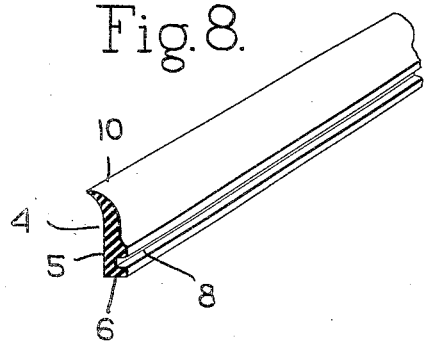
Inventor.
Max Zaiger
by Heard Smith & Tennant.
Attys.

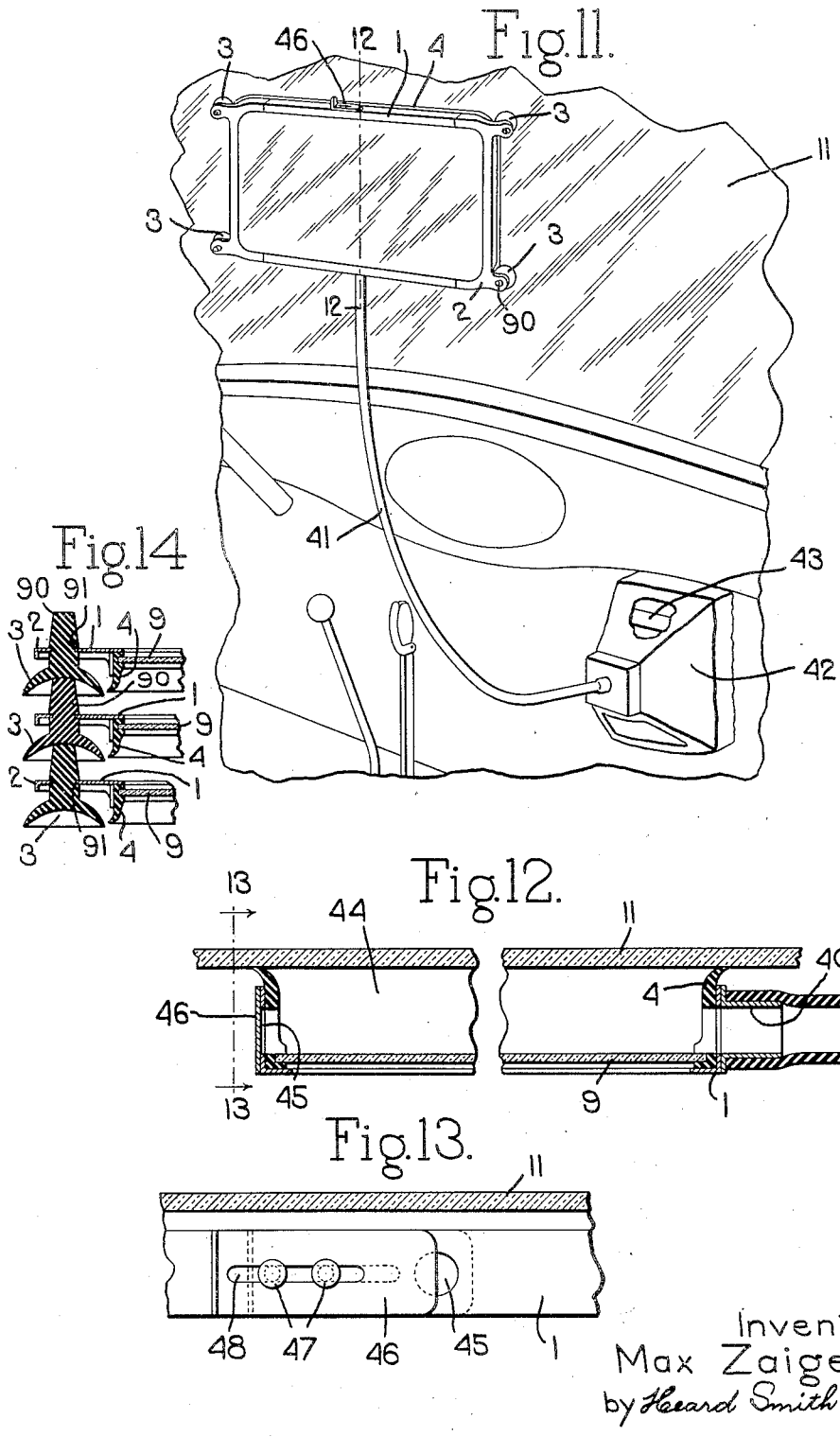

Patented June 25, 1935

2,006,005

REISSUED

UNITED STATES PATENT OFFICE 2,006,005

WINDSHIELD HEATER

Max Zaiger, Swampscott, Mass.

Application December 18, 1934, Serial No. 758,073

7 Claims. (Cl. 219—19)

This invention relates to windshield heaters of the so-called "glass pane" type and the object of the invention is to provide improvements in windshield heaters of this type which will be more fully hereinafter set forth.

In order to give an understanding of the invention I have illustrated in the drawings some selected embodiments thereof which will now be described after which the novel features will be pointed out in the appended claims.

In the drawings:

Fig. 4 is a view showing the individual parts from which the frame is made.

Fig. 5 is a fragmentary view showing the one-end piece and one-end rail assembled.

Fig. 6 is a section on the line 6—6 Fig. 5.

Fig. 7 is a section on the line 7—7 Fig. 2.

Fig. 8 is a sectional fragmentary view showing the strip from which the glass-supporting member is formed.

Fig. 9 is a sectional fragmentary view showing the manner in which the ends of the strip are connected together.

Fig. 10 is a fragmentary view showing a different embodiment of the invention.

Fig. 11 is a fragmentary perspective view showing a different embodiment of the invention.

Fig. 12 is an enlarged sectional view on the line 12—12 Fig. 11.

Fig. 13 is a sectional view on the line 13—13 Fig. 12.

Fig. 14 is a fragmentary sectional view showing the way in which a plurality of windshield heaters may be packed for shipment.

One form of my improved windshield heater comprises a metal frame-carrying suction means for attaching it to the windshield, a glass-supporting member of rubber fitting within the frame and provided on its inner face with a glass-receiving groove, a pane of glass having its edges received in said groove and operating to hold the rubber glass-holding member in position in the frame, said glass-holding member having a flexible lip to engage the windshield glass and make a tight joint therewith, electrical heating means within the frame situated adjacent the sides thereof and reflector elements operating to reflect heat radiated from said heating elements toward the center of the frame. In another form of the invention the air in the chamber between the glass pane and the windshield is heated by warm air delivered either from the heater used in heating the automobile, or from the muffler, exhaust pipe or other source of heat.

Figure 1:
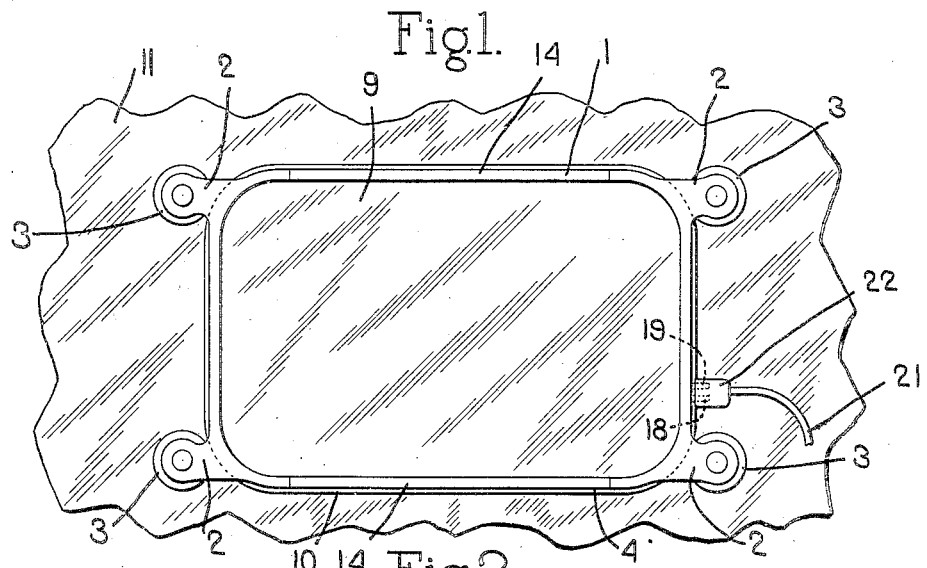
Fig. 1 is a view of my improved windshield heater applied to the windshield of an automobile.
Figure 2:
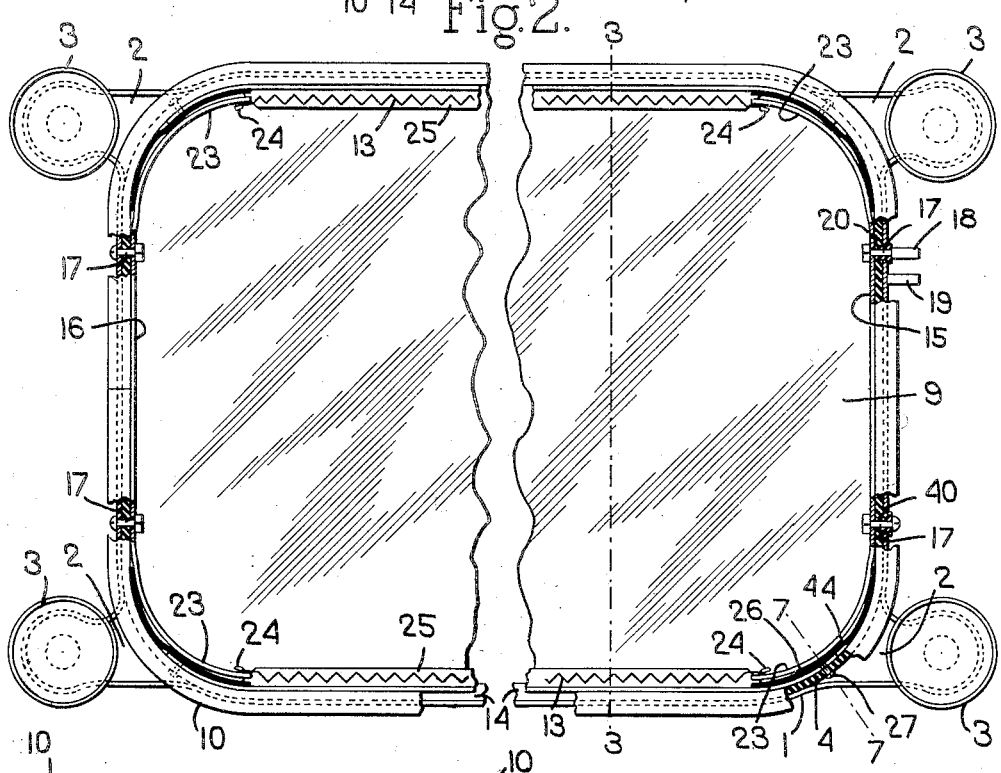
Fig. 2 is an enlarged view with a portion broken out showing the side of the heater which contacts with the glass of the windshield.
Figure 3:
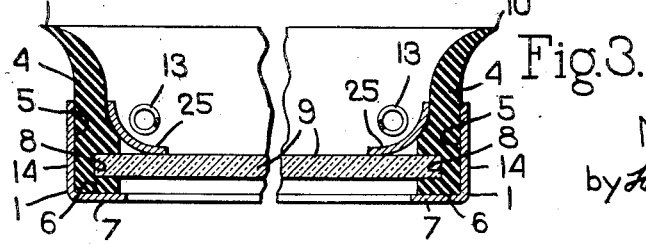
Fig. 3 is a section, with parts broken out, on the line 3—3 Fig. 2.

The metal frame of the construction shown in Figs. 1 to 10 is indicated generally at 1 and it is an angular cross-sectional shape. This frame is formed with ears or extensions 2, each of which supports a suction cup device 3, said suction cups constituting the means for holding the frame in position against the windshield as is usual in devices of this type.

Situated within the frame is a glass-holding member 4 of rubber which supports a pane of glass 9. This member is made in the form of a long strip of rubber which is molded or extruded to the cross-sectional shape shown, it having the outer flat face 5 to rest against the side wall of the frame, the flat face 6 to rest against the flange 7 of the frame, and the glass-receiving groove 8 to receive the edge of the pane of glass 9, and also having the flexible lip 10 adapted to engage the glass 11 of the windshield. This strip is cut to the right length and then is placed around the pane of glass 9 with the edges of the glass occupying the groove 8, and the two ends of the strip of rubber may be fastened together in some suitable way as by means of the staple fastening 12. The pane of glass is shown as formed with rounded corners and as the glass-holding member 4 is in the form of a strip, said strip may be readily bent around the rounded corners of the glass and will conform to the contour of said rounded corners as shown best in Figs. 2 and 10. The glass with the rubber strip encircling it is then set into the frame 1 and, when in place, the rubber strip is retained between the glass 9 and the frame 1, the glass thus acting as means to hold the rubber strip in position. The flexible edge 10 of the rubber strip projects beyond the frame sufficiently so that it engages the windshield glass 11.

13 indicates heating coils which extend from one end to the other of the frame and are preferably located along the sides 14 thereof. These heating coils are connected at one end to a bar 15 and at the other end to a similar bar 16, said bars being situated inside the glass-holding member 4. These bars 15 and 16 are secured to ends of the frame by any suitable means such as bolts 17 and one of the bars, the bar 15, is insulated from the frame 1 as shown at 40. The frame carries two terminals 18 and 19, the terminal 18 being insulated from the frame as shown at 20 and the terminal 19 being rigid with the frame. The current is supplied to the heating elements through a suitable cable 21 which is provided with a socket terminal 22 adapted to be removably applied to the terminals 18, 19. When the connections are made the circuit extends from the terminal 18 to the bar 15, thence through the coils 13 to the bar 16, thence to the frame 1 and the return circuit through the terminal 19.

The bars 15 and 16 are shown as extending clear across the ends of the frame and as having curved ends 23 to which the coils 13 are connected in some suitable way. One convenient way is to strike-up a finger 24 from each end of each bar to which fingers the coils 13 are attached.

It will be noted that the heating coils are situated adjacent the sides of the frame and thus are not visible through the glass pane. This is an advantage because it gives the driver of the automobile clear vision at all times. In order to increase the efficiency of the heating coils in heating the center portion of the dead air space within the frame, I propose to employ reflectors 25 which extend along the sides of the frame and are located between the coils 13 and the rubber glass-supporting member 4. These reflectors serve to reflect toward the center of the frame the heat which radiates outwardly from the heating coils toward the walls of the frame and which, therefore, would normally be ineffective in heating the air within the frame.

These reflectors may be retained in position in any suitable way, preferably, however, by being secured to the glass-supporting member 4 by means of suitable rivets or other fastening devices 27. In the construction shown in Fig. 2 each reflector 25 has an extension 26 at its end which underlies the curved end 23 of one of the bars 15, 16 and the rivets or fastening devices 27 are secured to said extensions. Where this construction is employed it is desirable to use insulation 44 between the curved ends 23 of the bars 15, 16 and the extensions 26 of the reflectors.

In Fig. 10 a construction is shown in which there is no overlapping of the curved ends 23 of the bars 15, 16 and any portion of the reflectors, the reflectors having such longitudinal dimensions that the ends thereof are spaced from the ends of the bars 15, 16. In this construction the rivets or other fastenings 27 are located at the longitudinal side walls of the frame.

The metal frame 1 is preferably made of a plurality of separate sections which are welded, riveted or otherwise secured together to make a rigid structure. In the construction herein shown the frame 1 is formed with the two end sections 28, 29 and with two side rails 14. Each end section 28, 29 is provided with the two arms 30 to which the side rails 14 are secured. The two end sections 28, 29 are duplicates in shape and may conveniently be pressed into shape from sheet metal by means of suitable dies. The side wall of each arm 30 is offset slightly as shown at 31. The side rails 14 are angle-iron in shape and each is formed adjacent each end with a transverse rib 32. In assembling the parts the ends of the side rails 14 are placed in the offset portions 31 of the arms 30 and the sections of the frame may then be spot-welded together at 33 or may be secured together in any other desirable way. The ribs 32 function as positioning shoulders to correctly position the side rails with respect to the arms 30 when the parts are assembled.

After the separate parts comprising the frame have been spot-welded or otherwise secured together as shown at 33 the frame becomes a rigid, unitary structure. The advantage of making the frame this way is that it can be made with a relatively small amount of waste material for the end sections 28, 29 can be easily formed from sheet metal with a relatively small waste and the side rails 14 can be made from strips without any waste.

In the Figs. 11 to 13 there is shown an embodiment of the invention in which the heat required to keep the windshield free from snow and ice is furnished from the heater with which the automobile is equipped. In Fig. 11 the frame 1 has the same general construction as that shown in Figs. 1 to 10, and it has associated therewith the rubber glass-holding member 4 which carries the pane of glass 9. This metal frame 1 is secured to the windshield 11 by suitable suction cups 3.

In this embodiment of the invention, however, the air within the chamber between the glass frame 1 and the windshield 2 is heated by air from the automobile heater instead of through means of electric coils. The frame 1 is shown as having a nipple 40 secured thereto which receives one end of a flexible pipe 41 that extends to a hood 42 that is adapted to be stretched over the heater 43 by which the automobile is heated. When the heater is operated the fan which causes circulation of air over the heating coils forces some of the hot air through the pipe 41 into the space 44 between the glass pane 9 and the windshield 11, thereby heating this space and preventing the windshield from becoming frosted or coated with ice. The frame 1 is shown as having an outlet opening 45 which is adapted to be opened or closed through the medium of a sliding damper 46. When the device is operating, the damper may be moved to open the discharge opening 45, thereby providing a circulation of heated air through the chamber 44. This damper is in the form of a slide which is retained in place by two guiding studs 47 carried by the frame 1 and extending through a slot 48 in the damper. If the automobile is not equipped with a heater then the heat for heating the chamber 44 may be taken from some other source such, for instance, as the muffler or the exhaust pipe.

The suction cup devices 3 which I prefer to employ are constructed so that they not only perform the function of securing the heater to the windshield, but they also provide suitable cushion means between individual windshield heaters when they are packed for shipment, thereby eliminating danger of breakage of the glass. Upon referring to Fig. 14 it will be seen that each suction cup device has a stem portion 90 formed integral therewith and which extends through the ears or arms 2 of the frame, each stem being provided with a groove 91 to receive the metal of the arms. When the heaters are packed for shipment, the suction cup devices of one heater engage those of adjacent heaters and since the suction cup devices and their stems are made of rubber, such suction cup devices form resilient or yielding spacing members for spacing the frames from each other, thereby eliminating danger of breakage of the glass.

I claim:

1. A windshield heater comprising a frame, a glass-holding member of rubber fitting within the frame and provided with a flexible lip to engage the windshield, and having a glass-receiving groove, a pane of glass carried by said member and having its edges received in said groove, suction means to attach said frame to a windshield, a heating resistor extending along the side of the frame and a reflector between the glass-holding member and the resistor and arranged to reflect the heat of the coil toward the windshield.

2. A windshield heater comprising a frame, a pane of glass, a glass-holding member in the form of a strip of rubber encircling the glass, said glass-holding member fitting within the frame and provided with a glass-receiving groove in which the edge of the pane of glass is received and also provided with a flexible lip to engage the windshield, means to attach said frame to a windshield, a heating resistor extending along each side of the frame and a reflector associated with each resistor to reflect the heat radiated therefrom toward the center of the frame.

3. A windshield heater comprising a frame, a pane of glass, a glass-holding member in the form of a strip of rubber encircling the glass and having its ends secured together, said glass-holding member fitting within the frame and provided with a glass-receiving groove in which the edge of the pane of glass is received and also provided with a flexible lip to engage the windshield, means to attach said frame to a windshield, a heating coil extending along each side of the frame, a reflector associated with each coil to reflect the heat radiated therefrom toward the center of the frame, and means to secure said reflectors to the glass-holding member.

4. A windshield heater comprising a frame having two one-piece U-shaped end sections, each having an offset portion at the extremity of each arm, and also having side rails connecting the end sections, each side rail being deformed adjacent each end to present a positioning rib against which the ends of the arms of the end sections engage, the extremities of the side rails occupying the offset portions of said arms and being rigidly secured thereto, a glass-holding member of rubber situated within the frame and having a glass-receiving groove, a pane of glass supported by said glass-holding member, and having its edges received in said groove, one edge of said glass-holding member extending beyond the frame and being shaped to constitute a flexible lip to engage the windshield, and an electric heating resistor within the frame extending from one end to the other thereof.

5. A windshield heater comprising a frame L-shaped in cross section, a glass-holding member of rubber fitting within the frame and provided with a flexible lip projecting beyond the frame and adapted to engage the windshield and also provided with a glass-receiving groove, a pane of glass carried by said member and having its edges received in said groove, said glass clamping the glass-holding member against the frame and retaining it therein, spaced terminals on said frame and electric heating resistors connecting said terminals.

6. A windshield heater comprising a frame having two one-piece U-shaped end sections, each having an offset portion at the extremity of each arm, and also having side rails connecting the end sections, each side rail being deformed adjacent each end to present a positioning rib against which the ends of the arms of the end sections engage, the extremities of the side rails occupying the offset portions of said arms and being rigidly-secured thereto, a glass-holding member of rubber situated within the frame and having a flexible lip to engage the windshield and also having a glass-receiving groove, a pane of glass supported by said glass-holding member and having its edges received in said groove, and means for heating the air in the chamber between the glass pane and the windshield.

7. A windshield heater comprising a frame, a glass-holding member of rubber fitting within the frame and provided with a flexible lip to engage the windshield and also provided with a glass-receiving groove, a pane of glass carried by said member and having its edges received in said groove, said frame having extensions, suction cup devices carried by the extension for attaching the frame to a windshield, each suction cup device having a stem of rubber integral therewith which extends through the corresponding ear or extensions, said stems providing resilient spacing members for spacing the frames from each other when they are packed for shipment.

MAX ZAIGER.

CERTIFICATE OF CORRECTION.

Patent No. 2,006,005.  June 25, 1935.

MAX ZAIGER.

It is hereby certified that error appears in the printed specification of the above numbered patent requiring correction as follows: Page 3, first column, lines 30 and 31, claim 3, for "coil" read resistor; and second column, line 42, claim 7, for "extension" read extensions; and that the said Letters Patent should be read with these corrections therein that the same may conform to the record of the case in the Patent Office.

Signed and sealed this 6th day of August, A. D. 1935.

(Seal)

Leslie Frazer
Acting Commissioner of Patents.